Aug. 4, 1936.     A. RASMUSSEN     2,049,626
POWER HACKSAW MACHINE
Filed Oct. 26, 1934
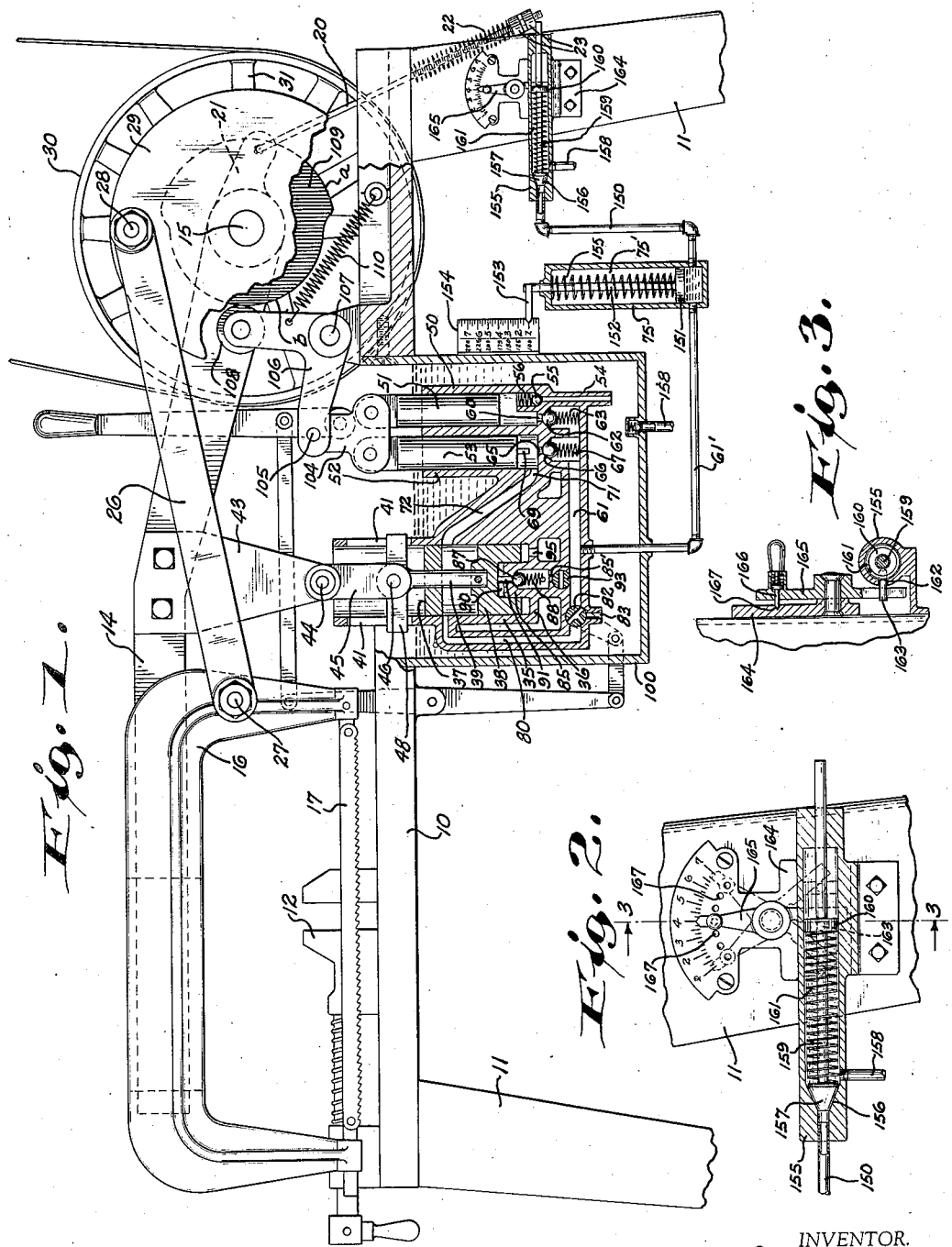
INVENTOR.
Andrew Rasmussen,
BY
Morsell, Lieber & Morsell
ATTORNEYS Patented Aug. 4, 1936

2,049,626

UNITED STATES PATENT OFFICE 2,049,626

POWER HACKSAW MACHINE

Andrew Rasmussen, Racine, Wis.

Application October 26, 1934, Serial No. 750,063

8 Claims. (Cl. 29—73)

This invention relates to improvements in power hack saw machines, and more particularly to means for controlling the feeding of the saw blade relative to the work during the cutting strokes.

The present improvements are herein shown as applied to the type of hack saw illustrated in the Rasmussen Patent #1,211,964, wherein the reciprocating saw frame is normally overbalanced in such manner that when the feed mechanism is released, the saw frame will be overbalanced to carry the saw away from the work. This occurs at the end of the cutting stroke whereby the saw does not drag on the bottom of the work during its non-cutting or return stroke.

Among other things a general object of the invention is to provide a novel hydraulic feed mechanism for power hack saw machines combined with means for gradually building up the feed pressure.

The prior Rasmussen Patent #1,334,166, sought to accomplish the last-mentioned object by the provision of pneumatic cushioning means in conjunction with the feed mechanism for gradually building up the feed pressure and for cushioning the feed of the saw blade.

In said prior construction, however, it was found that it was essential to initially build up a predetermined pressure within the pneumatic cushioning chamber, since it was necessary to overcome the force of the overbalancing spring for the saw frame before the saw could cut into the work. This initial building up of pressure took quite a length of time and therefore detracted from the efficiency of the machine. In addition, due to the inherent peculiarities of air used in the cushioning chamber, it was found that after the pressure had been built up to overcome the overbalancing spring, the build up of the pressure thereafter could not be accurately controlled, and the pressure would increase too rapidly and too much force would be applied to the saw frame.

It is, therefore, a primary object of the present invention to overcome the afore-mentioned difficulties attendant to the incorporation of a pneumatic cushioning chamber in a power hack saw hydraulic feed mechanism, by providing, in lieu of a pneumatic cushioning chamber, a confined spring controlled arrangement, whereby no time is lost at the outset and the saw will commence cutting at the first stroke of the pump when the saw is in contact with work, and in addition, thereafter as additional pressure is required on the saw frame, the spring will be gradually compressed at a controllable predetermined rate. By this arrangement the saw will operate at the greatest efficiency and it will not be subjected to undue strain nor be damaged.

A further specific object of the invention is to provide in a power hack saw machine, spring controlled means for determining the build-up of pressure applied to the saw frame, said spring controlled means being equipped with an integral indicator to show at all times the amount of pressure actually being applied to the saw or failure of some portion of the apparatus.

A further specific object of the invention is to provide in a power hack saw machine, manually operated selective means for limiting the maximum build-up of pressure attainable.

A further object of the invention is to provide a power hack saw machine which is of simple construction, is strong and durable, is efficient in its operation, and which is well adapted for the purposes set forth.

With the above and other objects in view the invention consists of the improved power hack saw machine, and its parts and combinations as set forth in the claims, and all equivalents thereof.

In the accompanying drawing in which the same reference characters indicate the same parts in all of the views:

Fig. 1 is a side view of a power hack saw to which the invention is applied, showing the feed and pressure build-up mechanisms in vertical section, portions of the saw mechanism being broken away;

Fig. 2 is an enlarged, fragmentary, detail sectional view of the relief valve control mechanism; and Fig. 3 is a sectional view thereof taken on line 3—3 of Fig. 2.

Only those portions of the power hack saw machine necessary to illustrate the adaptation thereto of the improvements constituting the present invention, are shown.

The machine comprises a table 10 supported on legs 11, and said table supports the usual vise 12 to hold the work in the machine.

A vertically swinging saw frame guide and support is designated by the numeral 14 and said member 14 is pivotally attached, adjacent its rear end, to the main drive shaft 15 of the machine. Said frame guide and support carries at its forward end the usual slide saw frame 16 between the legs of which is stretched a hack saw blade 17. The weight of the vertical swinging saw frame guide and the saw frame carried thereby is counterbalanced so that the outer end of the supporting frame and guide when not under the influence of the feeding mechanisms, tends to swing away from the saw table. This overbalancing effect can be produced by either overweighting the swinging saw supporting frame rearwardly of the main drive shaft 15, or it may be effected by spring pressure. For the purpose of illustration, the latter means is employed, and it will be seen that a rod or link 20 is loosely connected at its upper end to a tail piece 21 of the frame 14. The rod 20 extends through an apertured portion of the table and below the table and surrounding the rod is a coiled spring 22 which is confined between a shoulder on the table and certain nuts 23 threaded onto the lower end portion of the rod. The nuts 23 may be adjusted on the rod to vary the tension exerted by the spring.

The reciprocating saw frame 16 is operated through the medium of a pitman 26 which is pivotally connected at one end 27 to the saw frame and at its other end to a crank disc 29 by means of a crank pin 28. The disc 29 is secured to and rotates with the main drive shaft 15. Said shaft is provided with the usual tight and loose pulleys 30 and 31 providing means whereby power may be applied to operate the machine.

The feed mechanism for the power hack saw frame includes a feed cylinder 35 provided with a lower cylinder head 36 and an upper cylinder head 37. Within said cylinder there is a piston 38 having a piston rod 39 extending through a bearing in the cylinder head 37. The cylinder wall is provided with a guide extension provided with diametrically oposed guide slots 41. Attached to and depending from an intermediate portion of the saw frame guide and support 14 is an arm 43 which is adapted to rise and fall with said member 14. The lower end of said arm 43 is loosely connected to a link 45 by means of a pin 44. The link, in turn, is loosely connected at its lower end by a pin 46 with the upper end of said piston rod 39, said connection being above the upper head of the cylinder. The piston rod is also provided at its upper end portion with oppositely extending guide arms 48 which extend into said guide slots 41 and constitute means for guiding the link 45 and the upper end portion of the piston rod.

A vertical pump cylinder is indicated generally by the numeral 50 and in said cylinder an elongated plunger 51 is adapted to reciprocate. Formed integral with the pump cylinder 50 is another cylinder 52 adapted to contain a reciprocal plunger 53.

Extending from the lower end of the cylinder 50 is an intake 54 through which a fluid, such as oil, is drawn into the cylinder 50 when the plunger 51 rises therein. Said intake passage is controlled at its upper end by a ball valve 55. As illustrated, said ball valve is arranged so that it is pressed downwardly against an upwardly facing seat in the upper end of the passage 54 by means of a spring 56 suitably enclosed within the lower end of the cylinder 50. The lower end of said cylinder 50 is also provided with a discharge port 60 which affords communication between said cylinder and a closed distributing passage 61. As will hereinafter appear the feed pressure is built up within said passage 61. The port 60 is arranged with a downwardly facing seat engaged by a ball valve 62 yieldably held in position by a suitably mounted and confined spring 63.

The lower head of the cylinder 52 is likewise provided with a port 65 affording communication between the cylinder 52 and the distributing passage 61. Said port 65 has a downwardly facing seat which is closed by a ball valve 66, urged against its seat by a suitably mounted spring 67. Said valve is adapted to be moved away from its seat near the extremity of the down stroke of the plunger 53, by an axial extension 69 of said plunger 53. The cylinder 52 is further provided near its bottom portion with a lateral port 71 which communicates with one end of a passage 72. Said passage 72 communicates at its other end with the space in the feed cylinder 35 above its piston 38.

An enclosed cylinder 75 providing therein a compression chamber 75' is mounted in any convenient position. The lower end portion of said chamber 75' is connected with the distributing passage 61 by means of a pipe 61'. Also extending outwardly of the lower end portion of the cylinder 75 is an exhaust or discharge pipe 150. Within the chamber 75' is a piston 151 having an upwardly extending piston rod 152 projecting through the upper end of the cylinder 75 and suitably guided therein. The upper outer end of the piston rod 152 carries an indicator 153 adapted to move over the face of a graduated feed pressure indicating chart 154. The portion of the piston rod 152 within the chamber 75' is surrounded by a suitably tensioned coil spring 155. Said coiled spring engages a piston at one end and the upper head of the cylinder 75 at the other end, so that when the piston is raised by virtue of the fluid introduced thereinto from the pipe 61', the spring 155 will be compressed and the indicator 153 will move relative to delineations on the chart 154.

A relief passage 80 communicates at its lower end with the distributing passage 61. The other end of said relief passage opens into the space of the cylinder 35 above the piston 38. Adjacent the junction of the passage 80 with the passage 61 is a three-way valve 82 of any conventional form, the valve being constructed and arranged so that in one adjustment it affords communication of the distributing passage 61 with the relief passage 80 and also with the outlet branch 83 of said valve. In this adjustment the valve permits fluid to escape from the closed passage 61 and also from the upper end of the cylinder 35. In another position of the valve both the cylinder 35 and the distributing passage 61 are shut off from the outlet branch 83 and also from each other.

The cylinder 35 is provided at its lower end with an interior upstanding shell 85 which is formed at its upper end with a release port and is provided interiorly with a downwardly facing seat controlled by a ball valve 87 normally held in its seat by a spring 88. Said shell 85 is in communication with the distributing passage 61 by means of a branch 85'.

The piston 38 is provided with a central or axial downwardly opening recess 90 which closely receives the upper end of said shell when the piston is near the lower limit of its travel. The piston is provided at the top of its chambered portion with a central depending pin 91, which, as the piston approaches the lower limit of its travel, extends through the port of the shell 85 and engages and unseats the valve 87 so as to provide suitable communication between the distributing passage 61 and a small area within the cylinder below the top of the recess 90. At certain times when it is not desired to so establish communication between the distributing passage 61 and the interior of the shell 85, the branch 85' may be closed by any suitable form of cut-off valve 93 located in the branch between the valve 87 and the distributing passage 61.

The lower head of the cylinder 35 is provided with a release port 95 which opens into the space surrounding said cylinder. Preferably and as herein shown, the entire mechanism described, with the exception of the cylinder 75, and pipe 61', is enclosed in a casing or shell 100 which depends from the table 10 and may be attached thereto in any suitable manner. Said shell constitutes a reservoir for a non-compressible fluid such as oil, which serves as a medium for transmitting pressure to the saw feeding mechanism and also as means for lubricating the several movable parts of the mechanism. Furthermore, as herein shown, certain of the cylinders and the various passages connecting them, may be formed in a single casting or unit.

The cylinder 50 and plunger 51 constitute a pump for maintaining a suitable pressure in the system, while the cylinder 52 and plunger 53 constitute means for intermittently diverting or transmitting small quantities of the fluid under pressure in said system through the passage 72 to the cylinder space in the feed chamber 35 above the piston 38 thereof. So far as the essential operation of the invention is concerned, the pump comprising the cylinder 50 and the plunger 51, may be of any other form, as for instance, it may be a rotary pump and may or may not be connected to the measuring pump to operate in synchrony therewith, the function of the pressure pump being merely to maintain the proper pressure in the system, as herein shown. However, the plungers 51 and 53 of the pressure and measuring pumps respectively, are shown as simultaneously operated from a single point of power. To this end, a coupling yoke 104 is loosely attached to the upper ends of said plungers 51 and 53 and the upper end of said yoke is connected by a pin 105 with one arm of a bell crank lever 106. The bell crank lever is pivotally mounted at 107 in a bearing on the table 10. The other arm of said bell crank lever carries a roller 108 adapted to ride on the periphery of a cam 109 which is fixed to the main drive shaft 15. Said roller 108 of the bell crank lever may be held in engagement with the periphery of said cam by means of a spiral contractile spring 110 fixed at one end to the upstanding arm of said bell crank lever and secured at its other end to a suitable stationary support. When the higher portion $a$ of said cam engages said roller the plungers 51 and 53 are depressed through the action of the bell crank lever and when the lower portion $b$ of the cam engages the roller 108 the spring 110 may serve to raise said plungers.

From the foregoing description it will be obvious that the operation of the feed mechanism described thus far is as follows: The plunger 51 is adapted to be depressed and raised once during each rotation of the drive shaft and the cam 109, and likewise the plunger 53 is depressed and raised in synchrony therewith. The relationship of the strokes of the pump plunger to the measuring plunger is not essential to the operation of the pump plunger. The operation of the measuring plunger to cause it to fall and rise once during each rotation of the cam 109 is essential, however, as the mechanism is so arranged to provide for proper timing of the feed mechanism.

The upward reciprocation of the plunger 51 serves to draw fluid from the tank or chamber 100 through the valved inlet 54 into the lower end of the cylinder 50. The depression of the plunger 51 expels said fluid downwardly through the valved port 60 into the distributing passage 61. At the beginning of the operation of the saw, the pressure space 61 is filled with fluid under normal pressure, and pressure is maintained in said passage and subsequently built up against the yielding force of the piston 151 which may be yieldingly raised in the cylinder 75' against the predetermined tension of the spring 155. Upon setting the mechanism into operation the saw frame 16 is, of course, reciprocated and the pump plunger 51 immediately begins the build up of pressure. Consequently the saw blade is initially pressed lightly on the work and the operation of sawing begins. The feed pressure is built up gradually against the piston 38 until a predetermined feed pressure is attained. The control of this latter feature is important in the present invention and will be hereinafter described in detail. The feed pressure force is transferred against the piston 38 by the action of the plunger 53 in its reciprocation by transferring the liquid in the cylinder 52 below the plunger 53 which theretofore in the last stroke of the plunger 53 was withdrawn from the feed cylinder by the ascent of said plunger and afterward, by the contact of the pin 69 with the valve 66 whereby the valve is unseated to divert fluid under pressure from the pressure passage 61 to the feed cylinder 35 above its piston 38. Said valve 66 is opened at about the time the saw has reached the beginning of its cutting stroke and the pressure of the fluid transmitted from the system into the cylinder 35 acts to force the feed piston 38 downwardly and, through the piston rod 39, link 45, and arm 43, to feed the saw to the work. The cylinder 75' contains the compressible coiled spring 155. As the fluid such as oil is forced from the passage 61 through the pipe 61' into the lower portion of the cylinder 75 below the piston 151, the piston 151 is gradually raised, with the increase in pressure in the oil in the system, and the raising of the piston 151 compresses the spring 155. The extent of the compression of the spring determines the pressure at which the fluid is delivered against the feed piston 38. The feed pressure on the piston 38 is maintained throughout the cutting stroke of the saw blade, which, in the present instance, is the back stroke thereof. It will be understood that the fluid under pressure is transmitted to the feed cylinder 35 above the piston 38 at a time when the bell crank roller 108 is traveling on the high portion of the cam 109 and at which time also the projection 69 is thereby depressed to unseat the valve 66. However, the lower end of the plunger does not at this time pass the receiving end of the port 71 which communicates with the feed cylinder passage or by-pass 72.

At the end of the cutting stroke of the saw the bearing roller 108 of the bell crank lever 106 passes onto the lower portion $b$ of the cam and the spring 110 raises said plunger. Thus raised, a small portion of the fluid is withdrawn from the upper end of the feed cylinder 35 through the by-pass 72 to permit the piston 38 to slightly rise and thereby permit the saw blade to be raised sufficiently to clear it from the bottom of the saw cut so that the saw will not ride on the bottom of the saw cut in the return or non-cutting stroke of the saw. The valve 66 is closed by the pressure below, the moment the plunger begins to rise. At the beginning of each cutting stroke, after the saw is set in operation to cut into a piece of work, the depression of the plunger 53 in the cylinder 52 will force the fluid contained in the cylinder below the piston through the passage 72 into the feed cylinder before the valve 66 is unseated by the plunger projection 69, so that the first feed pressure exerted on the piston 38 at the beginning of each cutting stroke of the saw is that due to the displacement of the fluid in the cylinder 52. This feed pressure is then supplemented by the higher pressure in the distributing passage 61 when the plunger descends sufficiently to unseat the valve 66.

The compressible spring 155 in the cylinder 75 serves as a cushioning medium to cushion the feeding effect of the fluid transmitted under pressure to the upper end of the feed cylinder. Should work of unexpected hardness be encountered by the saw or should the cutting edge of the saw be irregular, there will be some yielding of the saw feed due to the cushioning effect of the spring 155.

The provision of the central stud 91 in the recessed portion of the piston 38, so located as to unseat the valve 87 which controls the port of the upstanding shell in the lower end of the feed cylinder, provides means to reduce the feed pressure on the saw blade as said saw blade is nearing the end of its cutting in the work when cutting round or irregular angled stock. It is desirable to thus reduce the feed pressure when cutting round stock for the reason that as the saw blade approaches the lower arc of the stock the length of the saw cut decreases, and if the full operative pressure be maintained on the saw, there would be a tendency to break the teeth of the saw blade, and also there would be a tendency for the blade to break through the work in the final strokes in a manner to leave an objectionable bur on the stock. The reduction of the feed pressure on the saw when approaching the end of the cut is due to the fact that the unseating of the valve 87 by the stud 91 permits fluid from the distributing space 61 to be by-passed to the under side of the feed piston above the shell 85, and the pressure from the distributing passage 61 acts on the lower portion of the lower piston face, representing the upper wall of the recess, to effect a differential pressure from the same source against unequal areas of the upper and lower faces of the piston. This has the effect to neutralize a portion of the feed pressure acting on the upper face of the piston and to reduce the feed pressure.

When operating on work providing uniform support for the saw teeth, throughout the cut, such as flat bars and the like, such differential feed pressure will not be required. In this event, therefore, the valve 93 may be closed so that contact of the stud 91 with the valve 87 does not by-pass any portion of the pressure fluid to act on the lower face of the feed piston 38.

In conjunction with the feed pressure regulating and cushioning cylinder 75 there is provided an instrumentality for selectively regulating the maximum amount of the build-up of pressure attainable. It is obvious that the lower end portion of the cylinder 75 must be provided with an oil discharge port and the pipe 158 previously mentioned extends outwardly therefrom. A portion of said pipe 158 extends into a fitting 155 having a tapered valve seat 156 therein controlled by a tapered valve 157, which controls the by-pass or discharge of fluid to an exhaust branch 158 which may lead to any convenient interior portion of the tank 100. It is intended that the amount of opening movement of the valve 157 and consequent by-passing or discharge of oil through the pipe 158 be commensurate with the amount of pressure build-up within the fluid system. For this purpose, therefore, the valve 157 may be formed with an elongated valve rod 159 extending through and axially of the fitting 155. On a portion of the valve rod 159 considerably removed from the valve 157 there is slidably mounted a disc 160 against the face of which one end of a coiled spring 161 rests. The other end of the coiled spring engages an outer face of the valve 157.

A side wall portion of the fitting 155 is formed with an elongated slot 162 through which a pin 163, carried by the disc 160, projects. The spring 161 is of a predetermined tension and it is intended that the same be maintained, for a certain piece of work, in a predetermined position of elongation, thereby governing the amount of fluid pressure required against the other side of the valve 157, to cause opening of said valve. Therefore, there is mounted on a suitable support, adjacent the fitting 155, a bracket 164 formed with an upper face portion having graduations and numerical designations delineated thereon in an arc. The graduations may be of any selected value and as illustrated run from 1 to 7. As will appear hereinafter these graduations correspond with similar graduations appearing on a portion of the chart 154 and represent selectible settings for the attainment of predetermined maximum pressure build-ups. It is evident from an inspection of the chart 154 that opposite the vertical row of numbers ranging from 1 to 7 there is another vertical row ranging from 100 to 250. Said latter numbers indicate pounds of pressure applied to the tool and it will be seen that number 4 for instance indicates or corresponds with a build-up fluid pressure of 175 pounds. As will appear, if the numeral 4 is selected on the face of the bracket 164 and the device is set accordingly, the maximum build-up pressure attainable is 175 pounds and the indicator 153, during the operation of the machine, will slowly rise until it reaches the numeral 4 on the chart 154 whereupon it will rise no higher and the pressure will build up no higher because fluid pressure in the pipe 158 will have overcome the resistance of the spring 161 and caused a full opening of the valve 157 to by-pass fluid.

To maintain the disc 160 in a predetermined position with the consequent desired elongation of the spring 161 there is pivotally mounted on the bracket 164, intermediate its ends, a turnable indicator hand 165. The lower end of the hand 165 is adapted to engage in all positions against the extended pin 163. The hand 165 may be set in a desired position by any suitable means as by engaging a movable pin element 166 with any of a series of depressions 167 in the face of the bracket 164. Obviously if the hand 165 is swung relatively far in a clockwise direction with respect to Fig. 2 its lower end will move the disc 160 inwardly on the rod 159, compressing the spring 161. In this event it will mean that a high built-up pressure must be attained before the resistance of the spring is overcome to cause opening of the valve 157 to by-pass fluid. Conversely if the hand 165 is in a reverse position its other end will be further to the right in Fig. 2 permitting an outward movement of the disc 160 with a consequent elongation of the spring 161. Under this condition less built-up pressure will be required to cause an opening of the by-pass valve 157.

It will therefore be seen that as pressure is built up in the system the piston 151 is raised and the indicator 153 indicates on the chart 154 the amount of pressure attained at any particular time. Also, by virtue of the fitting 155 and associated parts, any setting of the hand 165 will so control the opening movements of the by-pass valve 157 that said by-pass valve will fully open upon the indicator 153 reaching a number on the chart 154 corresponding with the setting of the hand 165.

It will thus be understood that there is provided a feed mechanism which feeds the saw blade to the stock with a delicate pressure at the beginning of the operation and gradually builds up the pressure to a predetermined point as the work proceeds, and which is also constructed to reduce the feed pressure as the saw blade approaches the end of the cut. The regulation of the feed pressure at the beginning and at the end of the cut is advantageous inasmuch as it avoids undue pressure on certain teeth of the saw blade and also avoids burs on the stock at the end of the cut. Moreover the light pressure at the beginning of the cut makes it easier to direct the saw blade to the proper point on the stock, and also saves wear on the teeth of the saw blade at the beginning of the cut, and the advantage of so applying the saw blade to the work with a light pressure at the beginning of the cut is that time is given for the cutting compound to begin to flow freely on the blade and the work before substantial feed pressure is exerted on the saw. In the present construction, although the saw begins to cut immediately upon operation of the machine, when the saw blade is in contact with the work, substantial feed pressure of the saw blade on the work is not exerted until sufficient time has passed for a suitable amount of cutting compound to have reached the blade and stock.

At the end of the saw cut on any given piece of stock being operated upon, and preparatory to allowing the saw frame to rise freely under the influence of the over-balancing spring 22, it is necessary that fluid under pressure be released from the feed cylinder above the piston 38. It is also necessary that the fluid under pressure be released from the distributing space 61 so that in the beginning of the next cutting operation the feed pressure during the first cutting strokes will be light and will be gradually built up to normal operating pressure as the work proceeds. This is effected by adjusting the three-way valve 82 so as to connect the drain pipe 80 and the distributing passage 61 to the outlet branch 83 of said three-way valve. The means for accomplishing this movement of the valve is not shown but obviously it may be accomplished either manually or by some automatic means associated with a part of the machine.

In practice, the avoiding of the building up of too great a feed pressure in the system for particular sawing operations such as would impose too severe work on the saw blade when cutting hard material, is provided for. The means for preventing the building up of undue feed pressure may also be associated with means whereby the pressure so built up can be variably adjusted, for different kinds of work. Furthermore, the feed pressure should be varied to suit the conditions of the saw blades. For sharp saw blades, the feed pressure should be relatively lighter than for duller blades. Obviously, some adjustable tensioning means for the spring 155 may be provided, as for instance adjusting nuts (not shown).

It will be understood that the structural details of the device may be considerably varied within the scope and spirit of the invention and that the invention is not limited to the illustrated details, except within the scope of the appended claims. While the cutting tool shown is a hack saw, the feed mechanism may be applied to other cutting tools where the conditions obtain of feeding the tool to its work and retracting it therefrom.

From the foregoing description it will be obvious that the improved mechanism supplies means for feeding the tool to the work with gradually increasing pressure and for cushioning the return strokes. The improved pressure build-up and cushioning cylinder 75 is very important in the successful functioning of the machine as it permits immediate operation of the saw, with the subsequent gradual build-up of pressure to a predetermined amount. The amount of pressure to be eventually attained is, of course, regulatable and the hand 165 movable over the indicating face of the bracket 164 provides simple means for making the desired setting which will correspond with the ultimate position attained by the indicator 153 with respect to the chart 154. The mechanism is relatively simple and extremely efficient in operation, and is well adapted for the purposes described.

I claim as my invention:

1. Feed means for power hack saw machines comprising, in combination, a movable saw supporting guide, a feed cylinder, a piston therein operatively connected to said guide, a closed distributing space to contain fluid, means to force fluid under pressure to said space, means operative during each cutting stroke of the saw to divert a quantity of said fluid to the feed cylinder against the piston to feed the saw to the work, means operative during each non-cutting stroke of the saw to release a quantity of fluid from said cylinder, a pressure chamber in communication with the distributing space, a member normally exposed to said chamber and constantly movable by variations of pressure therein, and resilient means coacting with said member to predetermine the maximum attainable pressure in said chamber while preventing release of pressure therein.

2. Feed means for power hack saw machines comprising, in combination, a movable saw supporting guide, a feed cylinder, a piston therein operatively connected to said guide, a closed distributing space to contain fluid, means to force fluid under pressure to said space, means operative during each cutting stroke of the saw to divert a quantity of said fluid to the feed cylinder against the piston to feed the saw to the work, means operative during each non-cutting stroke of the saw to release a quantity of fluid from said cylinder, a member normally exposed to said chamber and constantly movable by variations of pressure therein, resilient means coacting with said chamber to predetermine the maximum attainable pressure in said chamber while preventing release of pressure therein, and means to regulably release pressure from said space.

3. Feed means for power hack saw machines comprising, in combination, a movable saw supporting guide, a feed cylinder, a piston therein operatively connected to said guide, a closed distributing space to contain fluid, means to supply fluid under pressure to said distributing space, a measuring cylinder provided with a valved port communicating with said distributing space and provided with a passage which connects it to the feed cylinder above said piston, a plunger in the measuring cylinder, means to connect said plunger to the saw operating mechanism to cause it to reciprocate during each operation of the saw, means carried by the plunger for opening the valved port during the cutting stroke of the saw, a variable pressure chamber in communication with the distributing space, a member normally exposed to said chamber and constantly movable by variations of pressure therein, and resilient means coacting with said member to predetermine the maximum attainable pressure in said chamber while preventing release of the pressure therein.

4. Feed means for power hack saw machines comprising, in combination, a movable saw supporting guide which is overbalanced to move the support away from the work table during the non-cutting stroke of the saw, hydraulic feed means to feed the saw to the work including a closed distributing space to contain fluid, means for building up fluid pressure in said space, a pressure chamber in communication with said distributing space, a piston in said chamber and movable against the force of a confined spring, said piston having a piston rod extending exteriorly of said chamber, a pressure indicating chart, and an indicator carried by the outer end of said piston rod and movable adjacent said chart to indicate attained fluid pressures.

5. Feed means for power hack saw machines comprising, in combination, a movable saw supporting guide which is overbalanced to move the support away from the work table during the non-cutting stroke of the saw, hydraulic feed means to feed the saw to the work including a closed distributing space to contain fluid, means for building up fluid pressure in said space, a pressure chamber in communication with said distributing space, a piston in said chamber and movable against the force of a confined spring, said piston having a piston rod extending exteriorly of said chamber, a pressure indicating chart, an indicator carried by the outer end of said piston rod and movable adjacent said chart to indicate attained fluid pressure, a fluid by-pass pipe extending outwardly of said chamber, a valve in said pipe adapted to be opened by predetermined fluid pressure thereagainst, and means regulating the freedom of movement of said valve, said means controlling the amount of pressure required to open said valve.

6. A power hack saw machine comprising, in combination, a saw supporting guide movable toward and from the work, and hydraulic feed means operatively connected to said guide to exert pressure thereon to feed the saw to its work during the cutting stroke thereof, said feed means being formed to immediately lightly apply the saw to the work during the first few cutting strokes and having a manually manipulable feed pressure control for pre-setting the maximum attainable feed pressure so as to gradually, yieldingly increase the feed pressure to a definite and predetermined value as the cutting proceeds and during subsequent cutting strokes, the feed pressure during said subsequent cutting strokes being in excess of that during the initial cutting strokes.

7. In a power hack saw, a movable saw supporting guide, means operatively connected to said guide to feed the saw to its work during the cutting stroke, means connected with said feed means for initially lightly applying the saw to the work during all portions of the first few cutting strokes and gradually, yieldingly increasing the feed pressure during all portions of subsequent cutting strokes to a predetermined point as the cutting proceeds, said means operating directly on said feed means and including a spring, there being means for automatically compressing the spring at a controllable rate during cutting operations.

8. A power hack saw machine comprising in combination, a saw supporting guide movable toward and from the work, and hydraulic feed means operatively connected to said guide to feed the saw to its work during the cutting stroke thereof, said feed means being constructed with hydraulically controlled means to immediately lightly apply the saw to the work during the first few cutting strokes and also having adjustable spring controlled means affecting said hydraulic means for gradually, continuously, and yieldingly increasing the feed pressure during subsequent cutting strokes to a predetermined point, whereby the feed pressure during any portion of said subsequent cutting strokes is in excess of that during the initial cutting strokes.

ANDREW RASMUSSEN.